(12) United States Patent
Li et al.

(10) Patent No.: US 10,380,137 B2
(45) Date of Patent: Aug. 13, 2019

(54) TECHNOLOGY FOR EXTENSIBLE IN-MEMORY COMPUTING

(71) Applicant: International Business Machines Corporation, Armonk, NY (US)

(72) Inventors: Yong Li, Newton, MA (US); Ryan Pham, San Jose, CA (US); Xiaoyan Pu, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 15/290,544

(22) Filed: Oct. 11, 2016

(65) Prior Publication Data

US 2018/0101583 A1    Apr. 12, 2018

(51) Int. Cl.
*G06F 16/00* (2019.01)
*G06F 16/25* (2019.01)
*G06F 16/2455* (2019.01)

(52) U.S. Cl.
CPC ...... *G06F 16/254* (2019.01); *G06F 16/24552* (2019.01)

(58) Field of Classification Search
CPC ........... G06F 17/30563; G06F 17/3048; G06F 16/254; G06F 16/24552
USPC ....................................................... 707/602
See application file for complete search history.

(56) References Cited

U.S. PATENT DOCUMENTS

| 5,734,885 | A | 3/1998 | Agrawal |
| 6,311,265 | B1 | 10/2001 | Beckerle |
| 8,713,138 | B1 | 4/2014 | Machiraju |
| 8,805,870 | B2 | 8/2014 | Chen |
| 9,063,992 | B2 * | 6/2015 | Bhide ............... G06F 17/30563 |
| 9,064,047 | B2 | 6/2015 | Agarwal |
| 9,160,704 | B2 | 10/2015 | Wein |
| 9,164,806 | B2 | 10/2015 | Oliver |
| 9,686,086 | B1 * | 6/2017 | Nguyen ............. H04L 12/1822 |

(Continued)

FOREIGN PATENT DOCUMENTS

WO      2015149015 A1    10/2015

OTHER PUBLICATIONS

Huang, et al., "Automating Data Integration with HiperFuse," 2014 IEEE International Conference on Big Data.

(Continued)

*Primary Examiner* — Thanh-Ha Dang
(74) *Attorney, Agent, or Firm* — Anthony V.S. England; Robert Bunker

(57) ABSTRACT

A user-defined function (UDF) is received in a central Computer System, which causes registration of the UDF and distributes the UDF to a cluster of computer system nodes configured for performing, in volatile memory of the nodes, extract-transform-load processing of data cached in the volatile memory of the nodes. First and second job specifications that include the UDF are received by the central Computer System, and the central computer system distributes instructions for the job specifications to the nodes including at least one instruction that invokes the UDF for loading and executing the UDF in the volatile memory of at least one of the nodes during runtime of the jobs. The central Computer System does not cause registration of the UDF again after receiving the first job specification.

20 Claims, 8 Drawing Sheets

(56) References Cited

U.S. PATENT DOCUMENTS

| | | | |
|---|---|---|---|
| 2004/0131163 A1* | 7/2004 | Burger | H04M 3/42314 379/88.17 |
| 2004/0133538 A1* | 7/2004 | Amiri | G06F 17/30457 |
| 2006/0242676 A1 | 10/2006 | Hoshino | |
| 2007/0038658 A1* | 2/2007 | Ghosh | G06F 16/24532 |
| 2008/0307430 A1* | 12/2008 | Friedlander | G06Q 50/22 719/313 |
| 2009/0077011 A1* | 3/2009 | Natarajan | G06F 16/24532 |
| 2009/0210631 A1* | 8/2009 | Bosworth | G06F 12/0875 711/141 |
| 2010/0241957 A1 | 9/2010 | Kim | |
| 2011/0270896 A1* | 11/2011 | Stegelmann | G06F 17/30342 707/803 |
| 2012/0324387 A1* | 12/2012 | Rausch | G06F 17/30563 715/771 |
| 2014/0149357 A1 | 5/2014 | Gupta | |
| 2014/0317046 A1 | 10/2014 | Benke | |
| 2015/0134592 A1* | 5/2015 | Verger-Del Bove | G06F 17/30563 707/602 |
| 2016/0034547 A1* | 2/2016 | Lerios | G06F 16/254 707/602 |
| 2016/0314176 A1* | 10/2016 | Dhayapule | H04L 67/1002 |
| 2017/0046412 A1* | 2/2017 | Levy | G06F 17/30442 |

OTHER PUBLICATIONS

Anonymous., "Extensible Workflows for Analytics on the Cloud," IP.com 000216341, Mar. 31, 2012.

Anonymous, "Automatic Bidirectional Linking of Objects from Different Cloud Services," IP,com 000219801, Jul. 16, 2012.

\* cited by examiner

TECHNOLOGY FOR EXTENSIBLE IN-MEMORY COMPUTING

FIELD OF THE INVENTION

The field of the present invention concerns distributing user-defined functions to a cluster of computer system nodes configured for performing, in volatile memory of the nodes, extract-transform-load processing of data cached in the volatile memory of the nodes.

SUMMARY

In a method, a user-defined function (UDF) is received in a central Computer System, which causes registration of the UDF and distributes the UDF to a cluster of computer system nodes configured for performing, in volatile memory of the nodes, extract-transform-load processing of data cached in the volatile memory of the nodes. First and second job specifications that include the UDF are received by the central Computer System, and the central computer system distributes instructions for the job specifications to the nodes including at least one instruction that invokes the UDF for loading and executing the UDF in the volatile memory of at least one of the nodes during runtime of the jobs. The central Computer System does not cause registration of the UDF again after receiving the first job specification.

System and computer program products relating to the above-summarized method are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, where:

DETAILED DESCRIPTION

Figure 1:
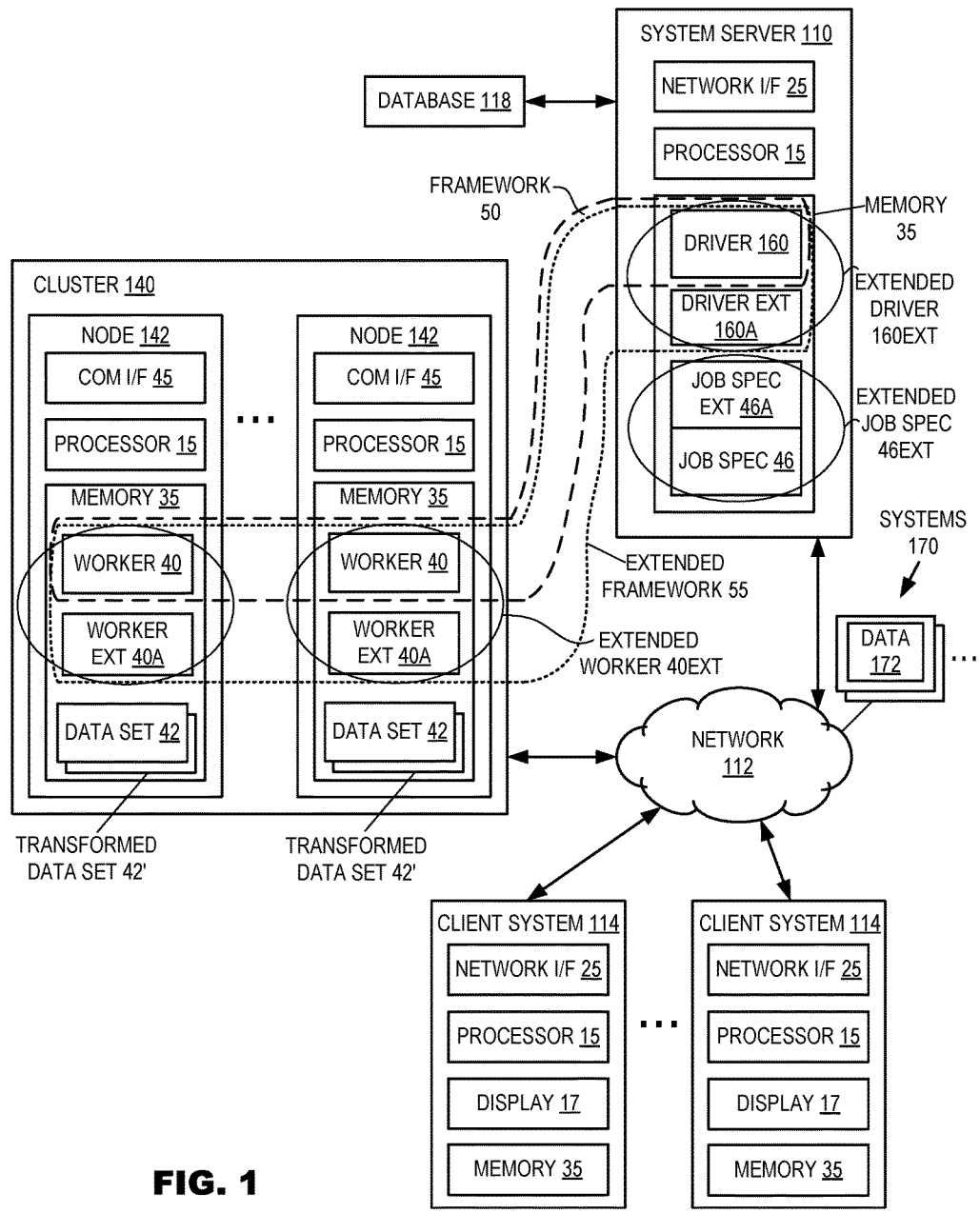
FIG. 1 illustrates an extended computing framework, according to embodiments of the present invention.

Embodiments of the present invention apply to a framework that executes a workflow dynamically in a distributed environment for processing jobs that extract data from a source, transform the data, and load the transformed data at a target storage location. More specifically, embodiments of the present invention provide a way to make the framework extensible, where the framework has a configuration of nodes with software modules executing on the respective nodes, including a central node and remote nodes.

In one or more embodiments of the present invention, the existing framework includes Apache Spark ("Spark"), which is a trademark of the Apache Software Foundation. Spark is an open source parallel data processing engine used for big data analytics applications across clustered computers. Spark can process data from a variety of distributed storage systems, including Hadoop Distributed File System (HDFS), in addition to custom systems. Spark architecture includes data storage (any Hadoop compatible data source), an application programming interface ("API") for programmers to develop Spark applications (Scala, Java, and Python languages), and a distributed computing resource manager (e.g., Mesos, Spark can also be deployed as a stand-alone system).

Spark uses a specialized data structure called a resilient distributed dataset ("RDD") which is a read-only collection of data items distributed across machines. RDDs are immutable, that is, they may be modified with a transformation (see below), but return a new RDD leaving the original RDD the same. A Spark API creates an initial RDD by transforming a collection of data in the driver program or a file, which may be in an extended file system.

Spark Core, the underlying general execution engine, provides distributed task dispatching, scheduling, and basic I/O functionalities through the API in which a driver program invokes parallel operations on an RDD by passing a function to Spark Core, which then schedules execution of the function's operations in parallel on the cluster.

There are two type of RDD operations:
 1) Transformation: A Spark API runs a function (e.g., map, filter, sample) on an existing RDD and creates a new RDD.
 2) Action: A Spark API evaluates an RDD using action operations (e.g., reduce, collect, count) and returns a value.

Spark breaks up processing of RDD operations into tasks, each of which is executed by an executor (also called "workflow module" in the present application). Prior to execution, Spark determines variable and methods that must be available for the executor to perform its computations on the RDD, which Spark then serializes and sends to each executor. A Spark launcher package provides classes that an API uses for launching Spark jobs. Spark's API passes functions in the driver program to run on the clusters.

Some Spark jobs require that several actions or transformations be performed on a particular data set. Spark provides a cache( )API that may be called for an RDD to hold the RDD in memory for future operations.

Spark supports lazy evaluation of big data queries. That is, Spark computes transformations only when an action requires a result to be returned to the driver program.

Spark includes an advanced directed acyclic graph (DAG) engine, allowing different jobs to work with the same data. Each Spark job creates a DAG of task stages to be performed on the cluster, and DAGs created by Spark can contain any number of stages. This allows some jobs to complete faster with simple jobs completing after just one stage, and more complex tasks completing in a single run of many stages, rather than having to be split into multiple jobs.

Spark SQL is a component on top of Spark Core used for structured data processing and running SQL like queries on Spark data. Spark SQL includes DataFrames, a distributed collection of data organized into named columns. It is based on the data frame concept in R language and is similar to a database table in a relational database. Spark SQL and DataFrame API are available in the Scala, Java, and Python.

Thus, Spark provides a simple, abstract API that allows users to explore data interactively with a variety of programming languages. Spark serves as the foundation for many higher-level applications, such as Shark (SQL), MLlib (machine learning), GraphX (graphing), and Spark Streaming (streaming), where each application is implemented as a library on top of Spark, allowing developers to write jobs that take advantage of two or more projects simultaneously.

In the existing framework, a driver software module (also referred to as a "workflow module" or simply a "flow module") resides on the central node and respective worker software modules reside on the respective remote nodes. That is, the driver module is configured with instructions that execute on the central node and the worker modules are configured with instructions that execute on the remote nodes. The driver module is configured to receive user-defined instructions for a workflow, i.e., to receive user-defined instructions that define activities for extracting, transforming and loading data, and to parse operations defined by the workflow and distribute different ones of the operations as instructions to different ones of the remote nodes. The remote nodes receive the respective operations of the workflow. The worker software modules on the remote nodes are configured with respective sets of instructions that enable each remote node to perform, in parallel with the other remote nodes, each remote node's respectively received workflow operations.

An extensibility functionality is added to the existing framework, according to embodiments of the present invention, which provides a modified framework. More specifically, the modified framework is provided by new data structures in addition to the modules of the existing framework at the central node and the remote nodes. (The added structures may be modules, themselves, and will be referred to herein as "modules." However, they may be incorporated into the existing modules.) By executing the resulting combination of new modules and existing modules of the modified framework, this enables a user to build transformation operations and, importantly, once the user has built a new transformation operation, the modified framework enables the user to dynamically load a new transformation operation module on the nodes at job execution time for performing the user-built operation, which is done without rebuilding the modified or new modules. That is, for the transformation operation module, the user compiles, for example, Java code on the central node and distributes the compiled code to the remote nodes for loading and execution without having to recompile code of the existing and new modules of the modified framework. With user-built transformation operations thereby dynamically added for the nodes, the modified framework is capable of performing the user-built operations when they are included in a workflow job specification distributed to the nodes by the driver software module, as modified by the new central node module.

A computing environment is illustrated in FIG. 1 according to embodiments of the present invention. Specifically, the computing environment includes one or more server systems 110, one or more client or end-user systems 114, and a cluster 140 of computing nodes 142. Server systems 110, client systems 114, and cluster 140 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and cluster 140 may be local to each other, and communicate via any appropriate local communication medium (e.g., local area network (LAN), hardwire, wireless link, Intranet, etc.).

Client systems 114 enable users to submit job specifications and other information, i.e., user-generated job spec 46, to server systems 110 to transform data sets such as data sets 42. Server systems 110 include respective flow modules 160 to distribute job specification 46 for concurrent, in-memory execution by nodes 142 of cluster 140 according to an in-memory computational model. (A module may also be referred to herein as a data structure or unit.) In this context, for an "in-memory computational model," a data structure is read in and sent to random access memory of the nodes for the nodes to execute directly, i.e., without serializing to disk.

A database system 118 may be provided in embodiments of the present invention to store various information for the data set transformation and job spec distribution. Database system 118 may be implemented by any conventional or other database or storage unit, may be local to or remote from server systems 110, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the job specifications and desired transformations, and may provide reports (e.g., transformed program or module, in-memory model, results of transformations, etc.).

Server systems 110 and client systems 114 may be implemented by any conventional or other computer systems preferably equipped with a display 17, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, flow module, browser/interface software, etc.).

Cluster 140 includes a plurality of computing nodes 142 in communication with each other to perform parallel processing and in-memory computations to process data. Computing nodes 142 of cluster 140 may be implemented by any conventional or other computer systems preferably equipped with a display or monitor, a base (e.g., including at least one processor 15, one or more memories 35 and/or communication interfaces or devices 45 (e.g., modem, network cards, etc.)), optional input devices (e.g., a keyboard, mouse or other input device), and any commercially available and custom software (e.g., communications software, computational software, etc.).

As stated above, a server system 110 includes a flow module 160 to distribute a job specification 46 for in-memory execution by cluster 140. More specifically, a flow module 160 of a server 110 distributes a job specification 46 to parallel node modules 40 for concurrent, in-memory computation on nodes 142 of cluster 140. Still more specifically, according to embodiments of the present invention, a flow module 160 in conjunction with parallel node modules 40 enables processing of an extract, transform, load (ETL) job concurrently by respective processors 15 of nodes 142 and, more specifically, enables in-memory 35 processing.

One or more modules 160 and parallel node modules 40 are included in, and operate in, an existing "parallel framework" 50. In one or more embodiments of the present invention, the existing parallel framework 50 includes Apache Spark, which is a trademark of the Apache Software Foundation. Spark provides a data structure for flow and worker modules 160 and 40 that is called the resilient distributed dataset (RDD), which Spark exposes through a language-integrated, application programming interface ("API"), where each dataset 42 processed according to job spec 46 is represented as an object and transformations on these objects are invoked using methods arising from the provided data structure.

Embodiments of the present invention provide additional modules ("pre-installed modules," i.e., installed before run-time), including i) a worker module extension 40A, such as for example, the IBM DataWorks SparkEngine, installed on each node 142 in a cluster 140 prior to running a job on the nodes 142 and ii) a driver extension 160A (such as, for example, the IBM DataWorks SparkDriver for Apache Spark application structure), where such a driver extension is also referred to herein as a flow module extension 160A. The addition of module 40A to worker modules 40 and the addition of module 160A to flow module 160 provide extended modules 40EXT and 160EXT for allowing users to add to the existing framework 50 during run-time of a job.

More specifically, users may specify new computing tasks in job spec extension 46A added to a job specification 46, such as an IBM DataWorks job specification, where the combination of specifications 46 and 46A provide an extended specification 46EXT that extends the capability of the existing parallel framework 50 to perform new tasks without recompiling job spec 46, according to embodiments of the present invention, wherein users employ the extended driver (i.e., extended flow module) 160EXT to distribute user-generated, extended job specs 46EXT dynamically (i.e., at run-time) to one or more of the plurality of nodes 142 for in-memory 35 execution by the extended framework 50EXT via the pre-installed, extended worker modules 40EXT. Accordingly, the additional modules 40A and 160A provided in embodiments of the present invention may be said to enable "dynamic extensibility" of the existing framework 50 for parallel, in-memory 35 execution on nodes 142, so that adding the modules 40A and 160A to the existing framework 50 provides a combined new framework referred to herein as an "extensible framework" 55.

The additional data structures 40A and 160A provided in embodiments of the present invention support extensibility at various levels, including flow, connector, operation, and user-defined function (UDF). In this context, "connector" refers to a way to read entire data 172 from an external source, e.g., system 170, or write entire data 172 to an external target 170. (Aside from whether entire data 172 is read or written, it should be understood that data 42 in memory 35 of nodes 142 may be obtained from data 172 in external systems 170 and that transformed data 42' in memory 35 of nodes 142 may be written to external systems 170.) "Operation" in this context refers to a map function or SQL statement for performing specific processing logic on a row basis, such as, for example, address verification, standardization, etc. A "UDF" in this context may be a scalar operation, which adds processing capability on a column basis, e.g., returning a single value for each row of a specified column of a data source, thereby providing another level of extensibility—from the row level down to the column level. "Flow" in this context refers to a set of operations or UDF's and data source or target connections.

Responsive to receiving a user request (such as via an application programming interface ("API") of the existing framework 50 (which may be modified by data structure 160A provided according to embodiments of the present invention), extended driver data structure 160EXT distributes operations and user defined functions of extended job spec 46EXT to nodes 142 (or any subset thereof, as specified in the request). Node data structures 40A provided according to embodiments of the present invention (and pre-installed on 142 or any subset thereof) receive the operations and UDF's distributed in response to job spec 46 and 46A and load them into memory 35.

In this manner, a user can build up a flow fully utilizing the built-in connectors and operations of existing framework 50, customized operations, or UDF's, which the user may submit to a cloud based service (like DataWorks, a product of International Business Machines Corporation) for ETL processing on cluster 140 with higher efficiency and lower cost. Each flow module 160 and 160A and worker module 40 and 40A and may include one or more modules or units to perform the various functions of present invention embodiments described below. The various modules (e.g., flow module, etc.) may be implemented by any combination of any quantity of software and/or hardware modules or units, and may reside within memory 35 of the server 110 and/or nodes 142 for execution by processors 15.

According to embodiments of the present invention, additional extensibility is provided by a "pin" operation that may be applied to register extension libraries of job spec extension 46A files with clusters 140 after the files have been distributed (via archives). The "pin" operation caches the extension libraries of files of job spec extension 46A for the next run of the same job 46 or a similar job 46, so the next job 46 run does not need to pay the cost to redistribute the same extension libraries 46A across clusters 140 again. To enable this, a tracking process arising from node data structure 40A keeps track of the extension libraries registered with each cluster's node 142, which includes computing the MD5 checksum on every extension library file associated with each job run. In this manner, the tracking process only redistributes a changed (or new) extension library file of job spec extension 46A when needed.

Using existing framework 50, a user may implement user-generated operations for changing a data set 42, wherein the user may specify the operations in an extended job spec 46EXT. The operations may run a Spark transformer, for example, with the data set 42 as an input, in which case a transformed version of the input data set is generated as an output data set 42' by the Spark transformer. The operations may run a Spark SQL query, for example, against the data set 42, in which case running the query generates an output data set 42'. Using extensible framework 55, the user may call UDF's in Spark SQL queries, for example, to perform operations on individual columns, such as text transformations provided by UDF's like Trim left, Trim right, Trim both, make Upper case, make Lower case, etc. and group functions provided by UDF's. For example, a "group" UDF may be included in a Spark SQL query like "Select dept, avg(salary) average_salary from emp group by dept." This ability to call UDF's extends the capability of Spark SQL.

UDF's can be shared by different Spark applications, such as DataWorks SparkEngine, NGP Spark applications, Note-Book, etc., so that the function provided by such a UDF does not have to be implemented separately by each application. This sharing of UDF's among applications eliminates the need to map a job's data set into different buckets for different applications. Also, there is, importantly, no need to rebuild core modules 160 and 40 of the computing framework when a developer creates a new UDF. The developer can distribute a new UDF extension in extension modules 40A and redistribute a revised UDF to clusters 140 without changing core modules 160 and 40. A UDF extension only needs to be distributed once and is reused.

Figure 2:
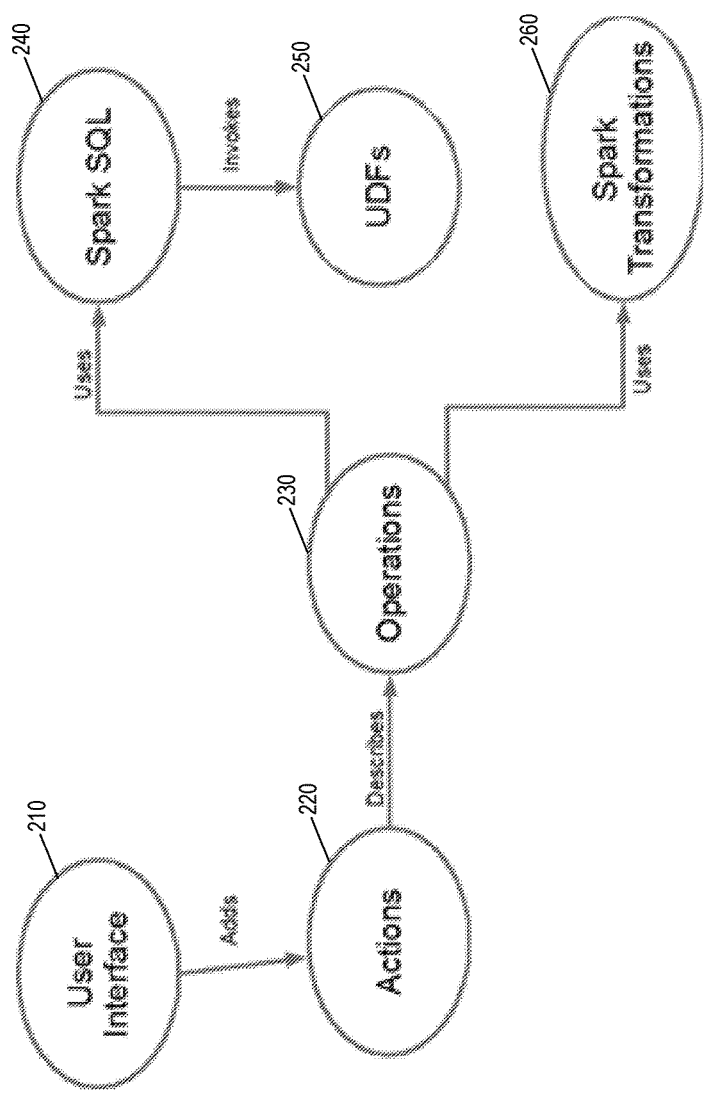
FIG. 2 illustrates actions, operations, and UDF's by users of the extensible computing framework of FIG. 1, according to embodiments of the present invention.

As previously stated, data structures 40A and 160A are added to the existing parallel framework to provide extensible computing framework 55 of embodiments of the present invention. Extensible computing framework 55 provides a user interface ("UI") 210 and allows users to build actions and operations and to invoke UDF's 250 as shown in FIG. 2, according to an embodiment of the present invention. UDF's 250 are developer generated and cannot be changed by end users. End users can only invoke them indirectly through operations 230. An end user typically selects a UDF 250 on an extended user interface provided by the addition of modules 160A and 40A, for performing UDF's 250 such as make a string upper case, sort records based on column, etc.

As previously stated, driver extension 160A (also referred to as flow module extension) and worker module extensions 40A are added to existing parallel framework 50 shown in FIG. 1 to provide extensible computing framework 55 of embodiments of the present invention. Extensible computing framework 55 of FIG. 1 uses an existing user interface ("UI") 210 or provides a UI 210 that allows users, as shown in FIG. 2, to build actions 220 and operations 230 and to invoke UDF's 250 according to a predefined format. UDF's 250 are developer-generated in the sense that they must be compiled and distributed prior to runtime and UDF's 250 cannot be changed by end users who do not have authorization to compile new classes, i.e., cannot be changed at runtime. End users can only invoke them indirectly through query operations 230, e.g., Spark SQL queries 240. End users can define operations 230 and actions 220 in data structure 46A included in job specification 46, i.e., without compiling new classes, where actions 220 describe how operations 230 can be used. The primary consumer of actions 220 is the UI 210. That is, the U 1210 drives actions 220, where an action is described by operations 230, which can be implemented using a Spark Transformation 260 or a UDF 250 in a Spark SQL Query 240 of an operation 230, for example.

Regarding UDF's 250 in embodiments of the present invention, SQL statements 240 in extended job spec 46A of job specification 46 can invoke classes defining UDF's 250 that have previously been compiled and distributed to extended node worker modules 40EXT in extensible computing framework 55, wherein SQL statements 240 may be in accordance with SparkSQL for an Apache Spark implementation of parallel framework 50, for example. That is, extended driver 160EXT registers with the SQLContext of framework 50, code (e.g., classes) defining UDF's 250 and sends it to extended worker modules 40EXT, so the UDF's 250 can then be invoked in a SQL statement 240 of an extended operation in user-generated job spec 46A that extends job specification 46. According to exemplary embodiments of a UI 210 of the present invention, the UI 210 supports four types of Spark SQL 240 UDF 250 classes that may be included in node data structures 160A, namely UDF1, UDF2, UDF3 and UDF4, where the numeric suffix indicates the number of parameters that the UDF accepts. For example:

sqlContext.udf( ).register("TITLECASE", (UDF1<?,?>) titleCaseUDF, DataTypes.StringType);
    sqlContext.sql("select TITLECASE(column1) from table1");

Regarding operations 230 and actions 220 in embodiments of the present invention, as shown in FIG. 2, an extended operation 230 of user-generated, extended job spec 46A is included in job specification 46 and is thereby invoked to modify a data set 42 through one or more UDF's 250 or Spark transformations 260, for example, that are defined in the extended operation 230. The UI 210 provides that the extended operation 230 is invoked in accordance with an action 220, i.e., in a predetermined format. According to one or more embodiments, actions 220 are defined in user-generated, extended job spec 46A first by names, followed by aspects including parameters for one or more operations 230, which the action invokes.

A UDF 250 is defined by Scala or Java code, for example, compiled into a jar file and distributed to worker modules 40 (e.g., Spark) on respective nodes 142 of cluster 140. A user simply specifies actions 220 in extended job specification 46A, and extended driver 160EXT translates this to operations 230 at runtime, and further compiles actions 220 to UDF 250 transformation 260 calls.

In the examples below, respective actions 220 are defined first by names "lowercase" and "uppercase," following by aspects as shown, including a "core/text-transform" operation defined and invoked in each action 220. In the example actions 220, the "core/text-transform" operation 230 is defined by a SQL expression 240 that the actions 220 recite. In the "lowercase" action 220, the recited "core/text-transform" operation 230 calls a "lowercase" UDF 250. In the "uppercase" action 220, the recited "core/text-transform" operation 230 calls an "uppercase" UDF 250.

```
{
    "name": "lowercase",
    "description": "Lowercase String",
    "icon": "Lowercase Icon",        "context": "column",
    "types": ["char", "varchar", "longvarchar"],
    "group": "Text Transformation",
    "operationId": "core/text-transform",        "map": {
        "EXPRESSION": "sql:LOWERCASE(${COLUMN_NAME})"
    }
},
{
    "name": "uppercase",
    "description": "Uppercase String",
    "icon": "Uppercase Icon",
    "context": "column",
    "types": ["char", "varchar", "longvarchar"],
    "group": "Text Transformation",
    "operationId": "core/text-transform",
    "map": {
        "EXPRESSION": "sql:UPPERCASE(${COLUMN_NAME})"
    }
}
```

Implementation of extensible framework 55 and extended actions 220, operations 230 and UDF's 250 referred to in extended job spec 46A includes defining UDF's 250 and shaping operations 230 in a capabilities.json file of user-generated data structure 46A, according to one or more embodiments of the present invention. (A shaping operation is one that changes the shape of in memory data structure 42. Examples include operations 230 on a data set to remove a column, sort based on one specific column, filter records out based on a specified condition, and split a column into multiple columns, such as splitting a Name column into FirstName, LastName, MiddleInitial etc.) Extended driver 160A includes a CapabilityManager class to provide a method for discovering capabilities.json files provided by developers in jars.

As previously stated, extended driver 160EXT registers classes defining UDF's 250 for sending to extended worker modules 40EXT, so the UDF's 250 can then be invoked in a SQL statement 240 of extended job specification 46EXT, as extended by job spec extension 46A. More specifically, in one aspect of driver 160EXT execution, the CapabilityManager method provided by the CapabilityManager class parses capability.json files to build an in memory representation of operations 230 defined therein, and creates a registry of the operations 230 and the jars that contain them, where the registry is external to existing parallel framework 50, e.g., external to Apache Spark, etc. Further, the CapabilityManager method causes node worker module extensions 40A, which have been added by embodiments of the present invention, to retrieve classes provided in driver extension 160EXT for extended operations 230 that are recited in extended job specification 46EXT but have not yet been registered by existing parallel framework modules 40 on respective nodes 142.

According to an embodiment of the present invention, a CapabilityManager class is provided as at least part of driver extension 160A to enable and manage extensibility. The method provided by the CapabilityManager class initializes when driver 160 of framework 50 initializes. When it initializes, CapabilityManager searches for capabilities.json files, which are data interchange objects. Specifically, CapabilityManager searches for data interchange objects of a particular name in packages on a classpath defined by driver 160 of framework 50, where the classpath is for user-defined classes. In an embodiment of the present invention, the data interchange objects may be json files, the particular name of the json files may be "capabilities," and the packages that contain the capabilities.json files may be may be Java archives ("jar" files, or simply "jar's"). According to an embodiment of the present invention, CapabilityManager also provides a user interface that allows a user to specify a particular directory and to direct CapabilityManager to dynamically load jars from the particular directory and search for a capabilities.json file in each jar, as well.

The capabilities.json of each jar identifies and describes the UDF's 250 that are included in the jar and also identifies and describes operations that use the identified UDF's 250, i.e., shaping operations, which are also included in the jar. The following is an example capabilities.json file, according to an embodiment of the present invention:

```
{
    "udfs": [
        {
            "name": "TITLECASE",
            "className": "com.ibm.is.drs.engine.spark.sql.udf.TitleCase",
            "dataType": "StringType"
        }
    ],
    "operations":[
        {
            "operationId": "core/text-transform",
                "version":   "2.6",
            "nodeBuilder": {
                "className":
"com.ibm.is.drs.engine.spark.nodebuilder.CoreTextTransformOperationNodeBuilder"
            }
        }
    ]
    "actions": [
        {
            "name": "titlecase",
            "description": "Titlecase String",
            "icon": "Titlecase Icon",
            "context": "column",
            "types": ["char", "varchar", "longvarchar"],
            "group": "Text Transformation",
            "operationId": "core/text-transform",
            "map": {
                "EXPRESSION": "sql:TITLECASE(${COLUMN_NAME})"
            }
        }
    ]
}
```

As in the above example capabilities.json file, each of the capabilities.json files is configured to contain one or more of three possible fields: UDF's, operations, and actions. The CapabilityManager is configured to read the three possible fields from each of the capabilities.json files. Each field specifies a respective list of UDF's, operations and actions for consumption by interfaces provided by driver 160. By reading the fields of each capabilities.json file, CapabilityManager of driver extension 160A determines the UDF's listed therein and passes their identifications to driver 160, which registers them and later retrieves them, when needed. (For example, driver 160 registers those UDF's discovered by the CapabilityManager, e.g., registers with Spark's SQL-Context for a Spark framework 50, which may be a SparkEngine.) In an embodiment of the present invention, driver 160 registers the UDF's in association with the so-called "shaping" operations with which they are identified in their capabilities.json file. In another embodiment of the present invention, driver 160 does not register the UDF's. That is, UDF's that are not meant to be shared do not need to be registered with the registry; they just need to reside in the same jar with the shaping operations that use them.

According to an embodiment, users cannot directly invoke the UDF's identified in their capabilities.json file. Rather, users can only indirectly invoke the UDF's identified in their capabilities.json file, which is by extended job spec 46EXT specifying shaping operations, i.e., operations identified in the capabilities.json file, where the capabilities.json file indicates the operations use the UDF's. The following is a shaping operation for title casing the FIRST_NAME column, according to an embodiment of the present invention:

```
{
    "columnName": "FIRST_NAME",
    "description": "Title case first name",
    "engineConfig": {
        "facets": [ ],
        "mode": "row-based"
    },
    "sqlExpression": "sql:TITLECASE(FIRST_NAME)",
    "onError": "SetToBlank",
    "op": "core/text-transform",
    "repeat": false,
    "repeatCount": 0,
    "version": "2.6"
}
```

In the capabilities.json file example above, the capabilities.json file maps an action for title casing a column to the "core/text-transform" operation that uses a SQL expression, which in turn invokes the UDF "TITLECASE." Thus, a user may specify this action in extended job specification 46EXT to cause extended driver 160A to distribute (for execution by one or more extended workers 40A) the "core/text-transform" operation that is mapped to the action in the capabilities.json file, and to cause extended driver 160A to likewise distribute the UDF "TITLECASE" that the capabilities.json file indicates is used by the SQL expression of the "core/text-transform" operation. (In one particular embodiment, framework 50 uses Spark SQL to perform the transformation; however, the same can also be implemented through a Spark transformation function.)

Regarding the registration and retrieval matter, driver 160 registers the UDF's identified for it by CapabilityManager of driver extension 160A from capabilities.json files, as stated previously. For shaping operations, driver 160 does this in a way such that driver 160 registers which shaping operation(s) is (are) associated with which UDF(s), so that driver 160 can retrieve particular UDF's when they are needed for their associated shaping operations. Further, since operations inside framework 50, e.g., Spark Engine, are encapsulated inside nodes, capabilities.json file is configured to specify a node builder class for each operation (e.g., shaping operation, in an embodiment) defined in the capabilities.json file, where the node builder class is configured to build a node that can process the shaping operation. Accordingly, when driver 160 registers the UDF's identified for it by CapabilityManager, driver 160 also registers an operation ID and version of each node builder class for each corresponding shaping operation.

Figure 3:
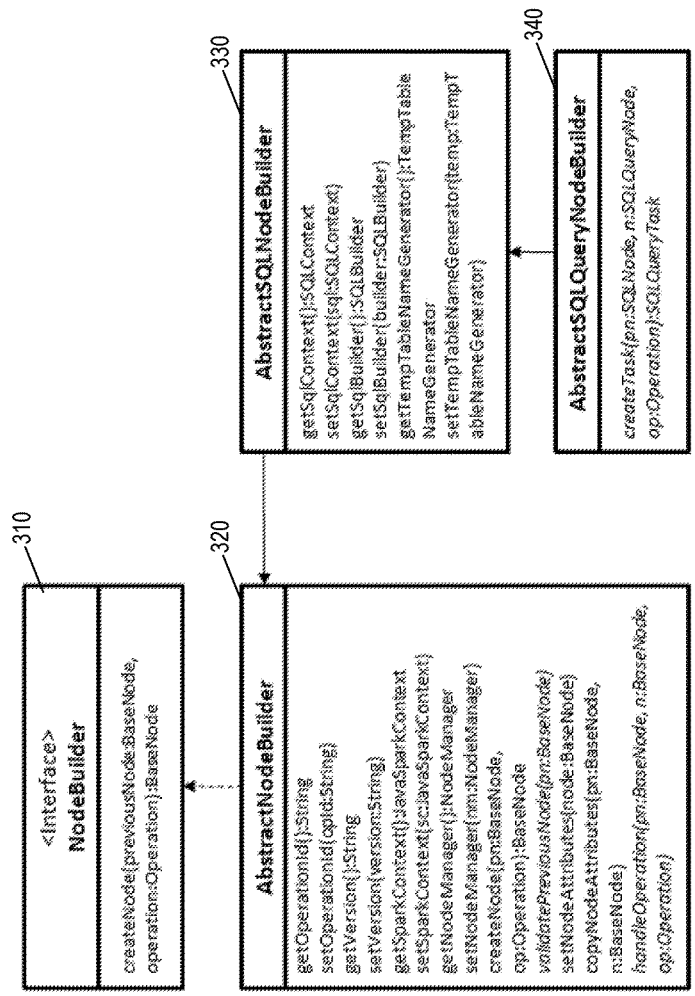
FIG. 3 illustrates node builder classes, according to embodiments of the present invention.

Each node builder class either implements NodeBuilder class 310 as shown in FIG. 3, according to an embodiment of the present invention, or extends one of AbstractNodeBuilder class 320, AbstractSQLNodeBuilder class 330, or AbstractSQLQueryNodeBuilder class 340. Node builder classes for operations that solely rely on Spark SQL, such as the "core/text-transform" operation can extend AbstractSQLQueryNodeBuilder class 340. Subclasses of AbstractSQLQuery-NodeBuilder class 340 only need to implement the "createTask" method; all node builder classes have access to the previous node, the current node, and the operation for the current node.

Figure 4:
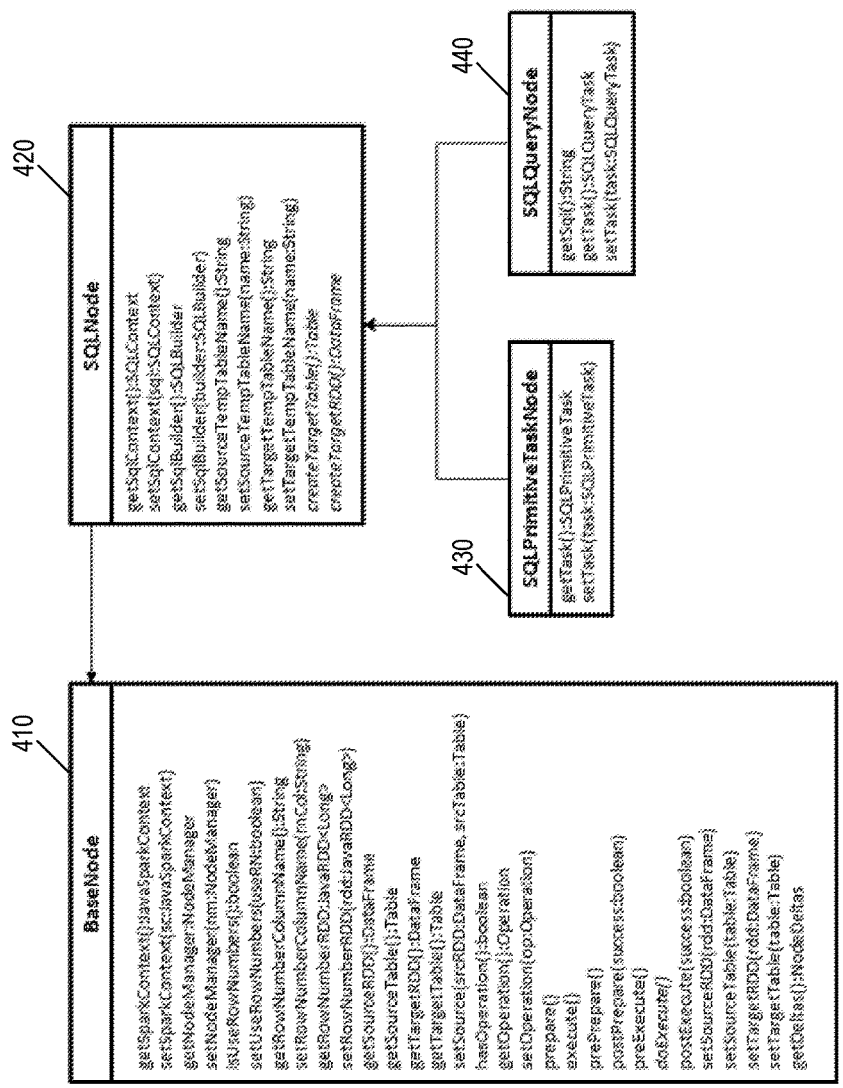
FIG. 4 illustrates SQL node builder classes, according to embodiments of the present invention.
Figure 5:
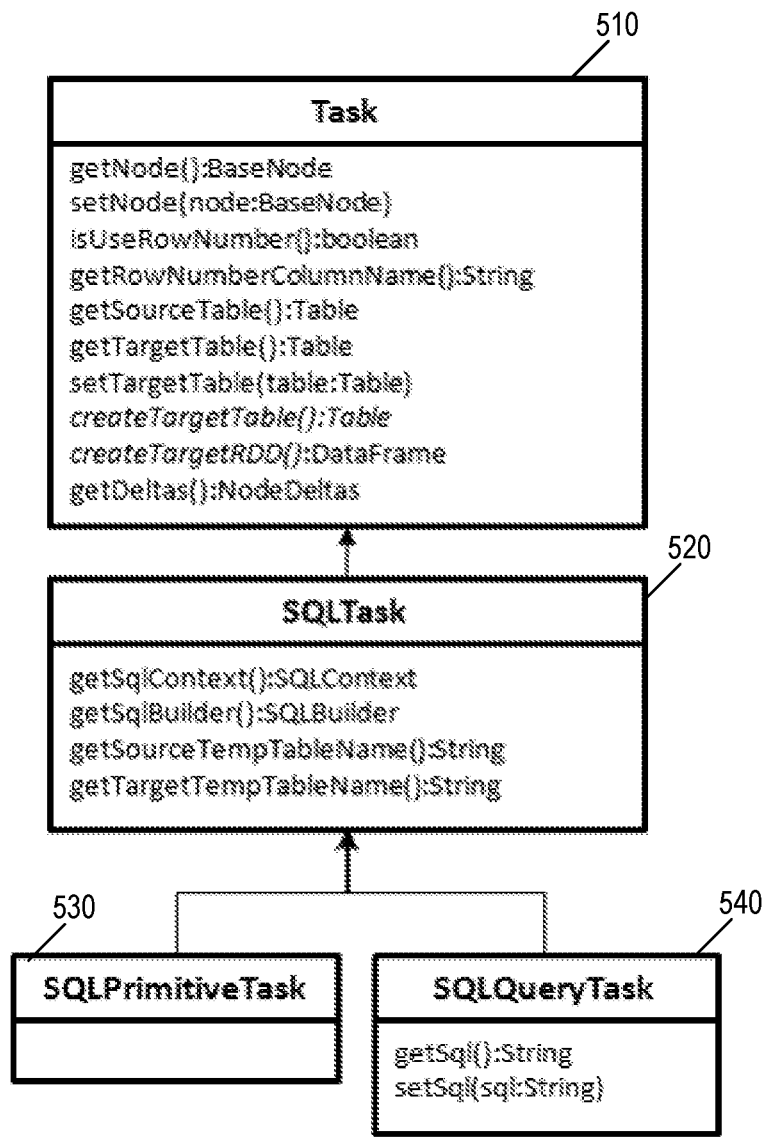
FIG. 5 illustrates task classes, according to embodiments of the present invention.

Operations that use Spark SQL and other Spark transform functions can extend the AbstractSQLNodeBuilder class 330 class and use either a SQLNode class 420 or a SQL-PrimitiveTaskNode 430, while others may use BaseNode class 410 or SQLQueryNode class 440, as shown in the node class diagram of FIG. 4 according to an embodiment of the present invention. Extending SQLPrimitiveTaskNode class 430 will delegate the execution of the operation to its associated task, an embodiment of which is illustrated for Task class 510, SQLTask class 520, SQLPrimitiveTask class 530, and SQLQueryTask class 540 in FIG. 5. The delegation is useful when an operation has multiple execution paths, each can be encapsulated in its own task.

Here below is an extended job 46A containing a UDF reference, according to an embodiment of the present invention:

```
Job:
{
    "name": "SAMPLE_JOB",
    "version": "1",
    "context": {...},
    "sources": [
        {
            "connector": {
                "id": "SRC_1",
                "type": "oracle",
                "props": [...]
            },
            "tables": [
                {
                    "columns": [...],
                    "name": "EMPLOYEE",
                    "id": "ORA_EMPLOYEE"
                }
            ]
        }
    ],
    "target": {
        "connector": {
            "id": "TGT",
            "type": "watsonanalytics",
            "props": [...]
        },
        "tables": [
            {
```

-continued

```
                "name": "WA_EMPOLYEE",
                "sourceIds": ["ORA_EMPLOYEE"]
            }
        ]
    },
    "flows": [
        {
            "invocationId": "ORA_2_WA",
            "sourceInteraction": {
                "tableRef": "ORA_EMPLOYEE",
                "connectorRef": "SRC_1",
                "props": [..]
            },
            "shapingOperations": [
                {
                    "operation": {
                        "columnName": "EMAIL",
                        "description": "Mask Email address for column EMAIL",
                        "sqlExpression": "sql:MASKEMAIL(EMAIL)",
                        "onError": "SetToBlank",
                        "op": "core/text-transform",
                        "version": "2.6"
                    },
                    "sequence": 1
                },
            ],
            "targetInteraction": {
                "tableRef": "WA_EMPLOYEE",
                "connectorRef": "TGT",
                "props": [...]
            }
        }
    ]
}
UDF Registration:
{
    "name": "MASKEMAIL",
    "className": "com.ibm.is.drs.engine.spark.sql.udf.MaskEmail",
    "dataType": "StringType"
}
Action Registration (for UI):
{
    "name": "maskemail",
    "description": "Mask email address",
    "icon": "MaskEmail Icon",
    "context": "column",
    "types": ["char", "varchar", "longvarchar"],
    "group": "Text Transformation",
    "operationId": "core/text-transform",
    "map": {
        "EXPRESSION": "sql:MASKEMAIL(${COLUMN_NAME})"
    }
}
Sample UDF Implementation:
public class MaskEmail implements UDF1<String, String>
{
    /*
     * (non-Javadoc)
     * @see org.apache.spark.sql.api.Java.UDF1#call(Java.lang.Object)
     */
    @Override
    public String call(String email) throws Exception
    {
            return maskEmail(email);
    }
    /**
     * Mask an email address
     * @param email the email address to mask
     * @return a masked email address
     */
    private String maskEmail(String email)
    {
            // perform email masking logic
            // generate an address with a random domain
            int endIndex = email.indexOf('@');
            String user = null;
            if (endIndex > 0)
            {
                    user = email.substring(0, endIndex);
```

```
        }
        else
        {
                user = RandomStringUtils.random(email.length( )/2);
                endIndex = email.length( )/2;
        }
        StringBuffer maskedEmail = new StringBuffer( );
        maskedEmail.append(user);
        maskedEmail.append("@");
        maskedEmail.append(RandomStringUtils.random(email.length( ) - (endIndex+3)));
        maskedEmail.append(RandomStringUtils.random(3));
        return maskedEmail.toString( );
}
```

The above job illustrates UDF function references, such as, for example, the UDF function MASKEMAIL( ), which is an extended function that is, like other UDF's automatically distributed by extended driver 160EXT to one or more extended workers 40EXT on extended framework 55, e.g., spark cluster. UDF's can be invoked by a shaping operation directly, where the shaping operation itself uses the UDF, or indirectly, where the shaping operation uses a SQL expression that uses the UDF. The "core/text-transform" in the job above is one that invokes a UDF indirectly. That is, the "MASKEMAIL( )" UDF is used by a SQL expression of the "core/text-transform" operation to transform text values in a particular way that masks email addresses.

It should be appreciated from the forgoing that in order to introduce a new action for masking email addresses, for example, only the capabilities.json file and the UDF for masking email addresses need to be implemented, according to an embodiment of the present invention. Once driver 160 registers a new UDF for its shaping operation, driver 160, e.g., SparkEngine, can then wait to retrieve it until a time when the shaping operation is actually needed, i.e., during runtime in response to extended driver 160ECT processing an extended job spec 46EXT that includes a shaping operation using the UDF. Otherwise, for UDF's that are not registered in association with shaping operations (which is on the assumption that such non-registered UDF's are shared), driver 160 retrieves the non-registered UDF's to a shared directory during runtime so that the non-registered UDF's are more generally accessible to all the extended workers 40A.

Figure 6:
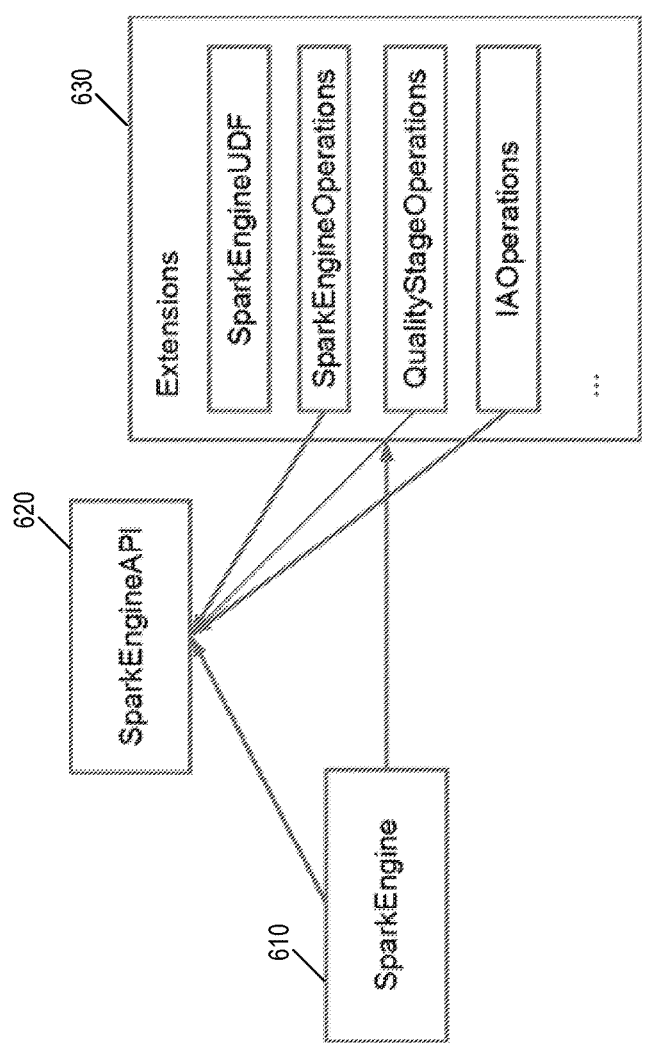
FIG. 6 illustrates components of the extended computing framework of FIG. 1, according to embodiments of the present invention.

Referring now to FIG. 6, components are illustrated of FIG. 1's extended computing framework 55, according to embodiments of the present invention. These include SparkEngine Core 610 and SparkEngine API 620, which are included in driver 160 of FIG. 1, and Spark Extensions 630, which are included in driver extension 160A of FIG. 1.

Figure 7:
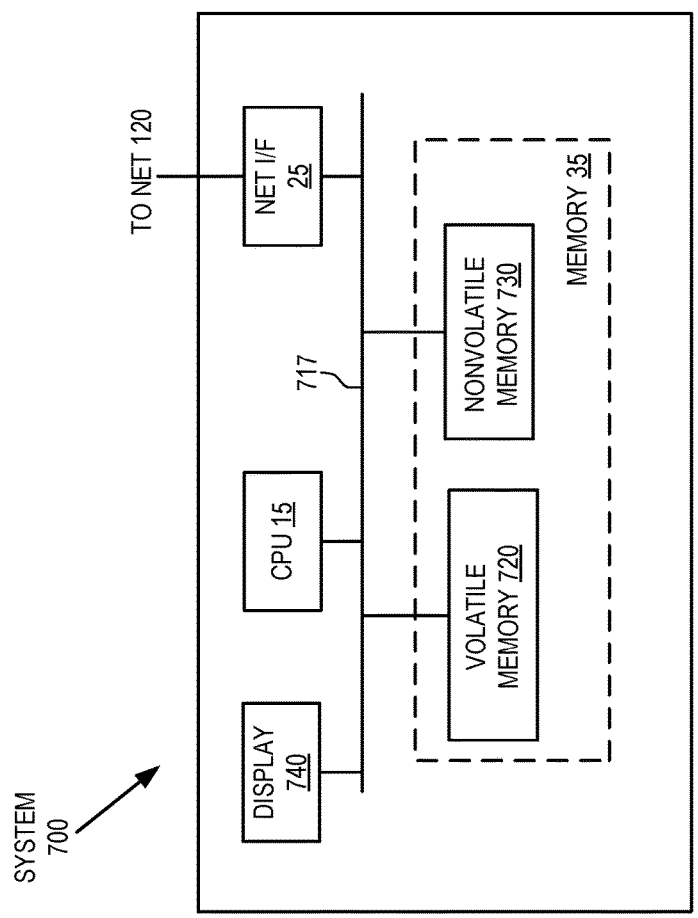
FIG. 7 illustrates details of a computer system suitable as computer systems shown in FIG. 1, according to embodiments of the present invention.

Referring now to FIG. 7, the figure illustrates details of a computer system 700 suitable as computer systems 110, 114, etc. according to embodiments of the present invention, wherein system 700 includes at least one central processing unit (CPU) 15, network interface 25, interconnect (i.e., bus) 717, memory 35 and display 740. For so-called "in-memory processing," CPU 15 loads programming instructions and data into volatile memory 720 for an entire job, and CPU 15 executes the entire job without loading additional instructions and data into volatile memory 720, such as, for example, from non-volatile memory 730. Interconnect 717 may facilitate transmission, such as of programming instructions and application data, among CPU 15, network interface 25, and memory 35. CPU 15 is representative of a single CPU, multiple CPUs, a single CPU having multiple processing cores, and the like. It should be understood that in various embodiments system 700 may be implemented by other hardware and that one or more modules thereof may be firmware.

Figure 8:
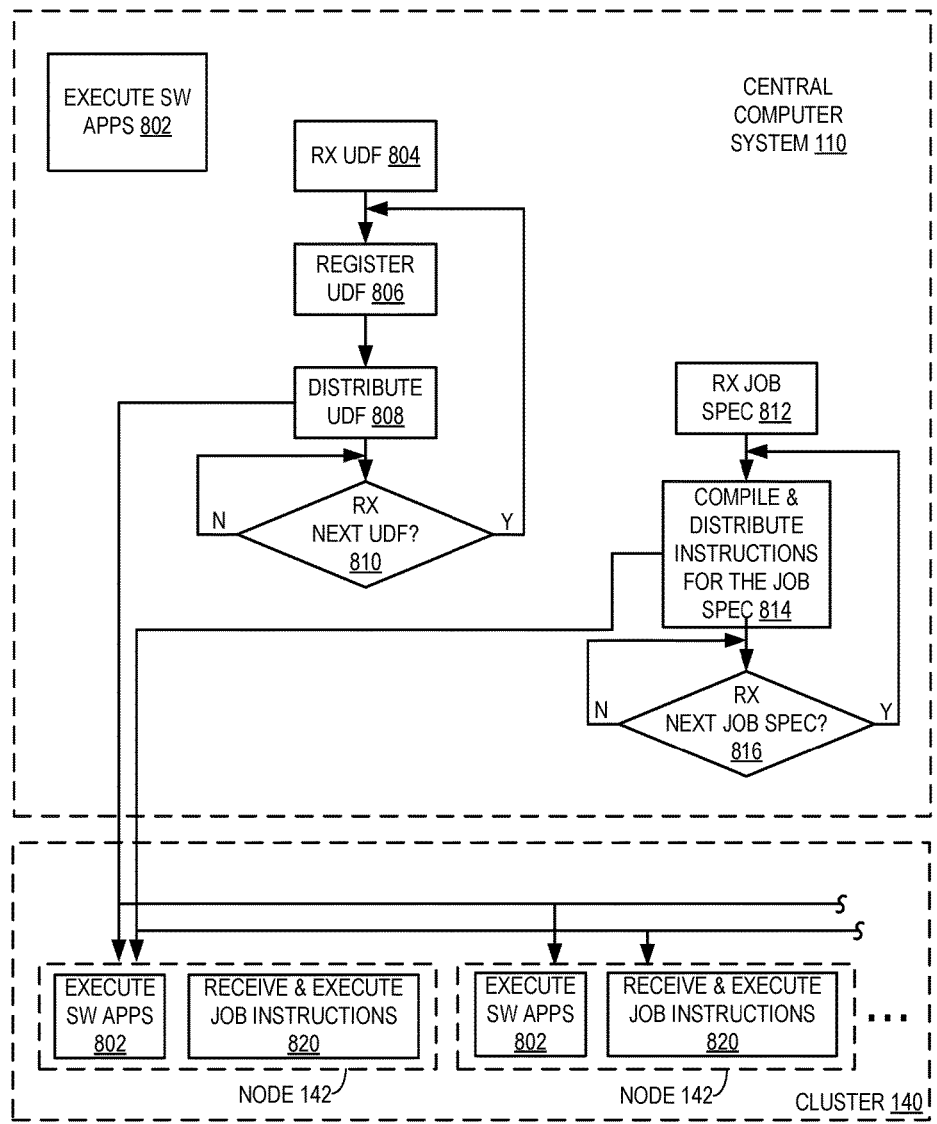
FIG. 8 illustrates actions performed by systems of FIG. 1, according to embodiments of the present invention.

Referring now to FIG. 8, the figure illustrates actions performed by central system 110 and other systems, i.e., nodes 142 of cluster 140 (FIG. 1), according to an embodiment of the present invention. As shown in action 802, central system 110 and nodes 142 each concurrently execute two or more software applications, such as, for example, "Information Analyzer," which provides data quality metrics, and "Streaming," which provides real-time data processing.

As shown in action 804, central system 110 receives a UDF, and at 806 causes registration of the UDF. In an embodiment, the user-defined function provides a mapping function, which is ultimately executed in volatile memory of nodes 142 during extract-transform-load processing of data cached in the volatile memory of nodes 142, as further described herein. At 808, central system 110 distributes the UDF to computer system nodes 142 configured for performing, in volatile memory of the nodes 142, extract-transform-load processing of data cached in the volatile memory of the nodes. At 810, central system 110 checks/waits for more UDF's.

Also, central system receives 812 a first job specification for a first job and, at 814, compiles the job into instructions and distributes to the computer system nodes 142 the instructions for the first job specification, including at least one programming instruction that invokes the UDF, so that at least one of the nodes 142 loads and executes the user-defined function in its volatile memory during runtime of the first job. In an embodiment, this includes each node 142 loading its respective programming instructions and data for an entire job into volatile memory of each node 142, and each node 142 executing its entire job without loading additional instructions and data into its volatile memory. In an embodiment, the at least one instruction that invokes the user-defined function includes a Spark SQL instruction.

At 816 central system 110 checks for a second job specification. In an instance, central system receives a second job specification for a second job at 816 and branches, once again, to 814, where it compiles the job into instructions and distributes to the computer system nodes 142 the instructions for the second job specification, including at least one programming instruction that invokes the UDF, so that at least one of the nodes 142 loads and executes the user-defined function in its volatile memory during runtime of the second job. Once again, this includes each node 142 loading its respective programming instructions and data for an entire job into volatile memory of each node

142, in an embodiment, and each node 142 executing its entire job without loading additional instructions and data into its volatile memory.

Executing the user-defined, mapping function, in an embodiment of the present invention, performs at least one of the following actions during extract-transform-load processing of data cached in volatile memory of the nodes: accessing a database; calculating data quality of data from the database; and writing the data quality. Even further, the above mentioned two or more applications share resources cached in nodes 142 of cluster 140 while executing the user-defined, mapping function that performs at least one of the actions during extract-transform-load processing of data cached in volatile memory of the nodes.

As stated above, the received job specifications are compiled 814 to generate the instructions distributed to nodes 142. In one instance, the so-called "first" job specification having the at least one instruction that invokes the user-defined function is added to an earlier received 812 job specification, where the earlier job specification does not have an instruction that invokes the UDF. (From the foregoing it should be appreciated that term "first" is merely for convenience and does not necessarily imply that no other job has been previously received.) In one aspect of an embodiment of the present invention, the earlier received job specification is compiled before receiving the so-called first job specification and is not recompiled after adding the first job specification.

In another aspect, the first job specification may include a pin operation that causes nodes 142 to cache at least one class file for the UDF in volatile memory of the nodes 142 for the second job run.

It should be appreciated from the foregoing that an embodiment of the present invention enables the definition and distribution of a UDF to perform address verification and enables use of that UDF in a constructed Spark SQL statement to determine how many rows contain a correct address. This information may then be used by a user defined mapping function to calculate a quality score. This is particularly advantageous since previously existing Spark SQL has no address verification capability.

Another advantage of certain embodiments of the present invention stems from an effect that arises from how a user builds user-generated operations. Rather than using an API specially for building operators, i.e., an "operator API," the user may build a user-generated operation using the API of the existing parallel framework 50. Operators built via an API must generally be recompiled if the API changes. Special operator API's are more subject to change than the general API of the existing framework 50. Thus, operators built using a general API of the existing framework 50 tend to be subject to the requirement of being recompiled less often.

In addition, extensibility did not previously exist on a column basis. Consequently, a user needed to write specific code in a customized operator for processing a particular column of a data set. If any attributes associated with the column changed or if the user wanted to process a different column, this required the user to modify the operator code and rebuild/redeploy the operator. In other words, the previous framework 50 did not handle column changers dynamically.

To perform address verification previously, a user first created data flow to read data, verified address via an add-on module, and wrote output data to a dataset. The user then used another program to process the generated dataset and calculate the quality score. Thus, address verification previously involved two programs and one intermediate dataset stored on disk for sharing between the programs. In an embodiment of the present invention, these features may be integrated, which is more efficient because of in-memory processing.

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a user-defined function (UDF) in a central Computer System, and the central computer system causing registration of the UDF and distributing the UDF to a cluster of computer system nodes configured for performing, in volatile memory of the nodes, extract-transform-load processing of data cached in the volatile memory of the nodes; and
   receiving by the central Computer System first and second job specifications that specify the UDF, and the central computer system distributing instructions for the job specifications to the nodes, including at least one instruction that invokes the UDF for loading and executing the UDF in the volatile memory of at least one of the nodes during runtime of the job, where the central Computer System does not cause registration of the UDF again after receiving the first job specification.

2. The method of claim 1, where the user-defined function provides a mapping function and the method includes executing the user-defined, mapping function in volatile memory of the nodes during extract-transform-load processing of data cached in the volatile memory of the nodes.

3. The method of claim 2, where executing the user-defined, mapping function performs at least one of the following actions during extract-transform-load processing of data cached in volatile memory of the nodes:
   accessing a database;
   calculating data quality of data from the database; and
   writing the data quality.

4. The method of claim 3, comprising:
   sharing resources among at least two software applications cached in nodes of the cluster while executing the user-defined, mapping function that performs at least one of the actions during extract-transform-load processing of data cached in volatile memory of the nodes.

5. The method of claim 1, where the at least one instruction that invokes the user-defined function includes a Spark SQL instruction.

6. The method of claim 1, comprising:
   compiling the received job specifications to generate the instructions distributed to the nodes, where the first job specification having the at least one instruction that invokes the user-defined function is added to an earlier received job specification having no instruction that invokes the user-defined function, and where the earlier received job specification is compiled before receiving the first job specification and is not recompiled after adding the first job specification.

7. The method of claim 1, comprising:
applying a pin operation to cause the nodes to cache at least one class file for the user-defined function in volatile memory of the nodes for a next job run.

8. A system comprising:
a processor; and
a computer readable storage medium connected to the processor, where the computer readable storage medium has stored thereon a program for controlling the processor, and where the processor is operative with the program to execute the program for:
receiving a user-defined function (UDF) in a central Computer System, and the central computer system causing registration of the UDF and distributing the UDF to a cluster of computer system nodes configured for performing, in volatile memory of the nodes, extract-transform-load processing of data cached in the volatile memory of the nodes; and
receiving by the central Computer System first and second job specifications that specify the UDF, and the central computer system distributing instructions for the job specifications to the nodes, including at least one instruction that invokes the UDF for loading and executing the UDF in the volatile memory of at least one of the nodes during runtime of the job, where the central Computer System does not cause registration of the UDF again after receiving the first job specification.

9. The system of claim 8, where the user-defined function provides a mapping function and the where the processor is operative with the program to execute the program for:
executing the user-defined, mapping function in volatile memory of the nodes during extract-transform-load processing of data cached in the volatile memory of the nodes.

10. The system of claim 9, where executing the user-defined, mapping function performs at least one of the following actions during extract-transform-load processing of data cached in volatile memory of the nodes:
accessing a database;
calculating data quality of data from the database; and
writing the data quality.

11. The system of claim 10, where the processor is operative with the program to execute the program for:
sharing resources among at least two software applications cached in nodes of the cluster while executing the user-defined, mapping function that performs at least one of the actions during extract-transform-load processing of data cached in volatile memory of the nodes.

12. The system of claim 8, where the at least one instruction that invokes the user-defined function includes a Spark SQL instruction.

13. The system of claim 8, where the processor is operative with the program to execute the program for:
compiling the received job specifications to generate the instructions distributed to the nodes, where the first job specification having the at least one instruction that invokes the user-defined function is added to an earlier received job specification having no instruction that invokes the user-defined function, and where the earlier received job specification is compiled before receiving the first job specification and is not recompiled after adding the first job specification.

14. The system of claim 8, where the processor is operative with the program to execute the program for:
applying a pin operation to cause the nodes to cache at least one class file for the user-defined function in volatile memory of the nodes for a next job run.

15. A computer program product, including a computer readable storage medium having instructions stored thereon for execution by a computer system, where the instructions, when executed by the computer system, cause the computer system to implement a method comprising:
receiving a user-defined function (UDF) in a central Computer System, and the central computer system causing registration of the UDF and distributing the UDF to a cluster of computer system nodes configured for performing, in volatile memory of the nodes, extract-transform-load processing of data cached in the volatile memory of the nodes; and
receiving by the central Computer System first and second job specifications that specify the UDF, and the central computer system distributing instructions for the job specifications to the nodes, including at least one instruction that invokes the UDF for loading and executing the UDF in the volatile memory of at least one of the nodes during runtime of the job, where the central Computer System does not cause registration of the UDF again after receiving the first job specification.

16. The computer program product of claim 15, where the user-defined function provides a mapping function and the where the instructions, when executed by the computer system, cause the computer system to implement a method comprising:
executing the user-defined, mapping function in volatile memory of the nodes during extract-transform-load processing of data cached in the volatile memory of the nodes.

17. The computer program product of claim 16, where executing the user-defined, mapping function performs at least one of the following actions during extract-transform-load processing of data cached in volatile memory of the nodes:
accessing a database;
calculating data quality of data from the database; and
writing the data quality.

18. The computer program product of claim 17, where the instructions, when executed by the computer system, cause the computer system to implement a method comprising:
sharing resources among at least two software applications cached in nodes of the cluster while executing the user-defined, mapping function that performs at least one of the actions during extract-transform-load processing of data cached in volatile memory of the nodes.

19. The computer program product of claim 15, where the at least one instruction that invokes the user-defined function includes a Spark SQL instruction.

20. The computer program product of claim 15, where the instructions, when executed by the computer system, cause the computer system to implement a method comprising:
compiling the received job specifications to generate the instructions distributed to the nodes, where the first job specification having the at least one instruction that invokes the user-defined function is added to an earlier received job specification having no instruction that invokes the user-defined function, and where the earlier received job specification is compiled before receiving the first job specification and is not recompiled after adding the first job specification.

* * * * *